United States Patent
Wix et al.

(10) Patent No.: US 9,232,431 B2
(45) Date of Patent: Jan. 5, 2016

(54) SELECTIVE LAYER-2 FLUSHING IN MOBILE COMMUNICATION TERMINALS

(71) Applicant: Marvell World Trade Ltd., St. Michael (BB)

(72) Inventors: Amit Wix, Petah-Tikva (IL); Amit Rahav, Karkur (IL); Gil Levy, Ramat Gan (IL)

(73) Assignee: MARVELL WORLD TRADE LTD., St. Micheal (BB)

(*) Notice: Subject to any disclaimer, the term of this patent is extended or adjusted under 35 U.S.C. 154(b) by 129 days.

(21) Appl. No.: 14/108,382

(22) Filed: Dec. 17, 2013

(65) Prior Publication Data

US 2014/0171138 A1    Jun. 19, 2014

Related U.S. Application Data

(60) Provisional application No. 61/739,418, filed on Dec. 19, 2012.

(51) Int. Cl.
*H04W 28/02* (2009.01)
*H04L 12/823* (2013.01)

(52) U.S. Cl.
CPC ......... *H04W 28/0226* (2013.01); *H04L 47/323* (2013.01)

(58) Field of Classification Search
CPC ....... H04L 47/323; H04L 47/32; H04L 47/29; H04L 47/30; H04L 47/31; H04L 47/33; H04L 47/50; H04L 47/52; H04L 47/70; H04W 28/0226; H04W 28/0215; H04W 28/0231

USPC ............ 455/509, 68, 73, 412.1, 414.3, 414.4, 455/450, 510, 456.2, 41.2, 69, 552.1, 115.1, 455/135, 150.1; 370/252, 328, 329, 254, 370/389, 390, 432, 236, 242, 216, 235; 709/226, 225, 203, 238, 207, 245, 206, 709/224, 233, 201

See application file for complete search history.

(56) References Cited

U.S. PATENT DOCUMENTS

| | | | |
|---|---|---|---|
| 5,828,835 A * | 10/1998 | Isfeld et al. .................. 709/200 |
| 6,240,067 B1 * | 5/2001 | Sorber ......................... 370/236 |
| 6,496,885 B1 * | 12/2002 | Smart et al. .................. 710/100 |
| 7,127,507 B1 * | 10/2006 | Clark et al. .................. 709/224 |
| 8,014,510 B2 | 9/2011 | Bordonaro et al. |
| 8,180,823 B2 * | 5/2012 | Hasti et al. .................. 709/201 |
| 8,321,515 B1 * | 11/2012 | Gailloux et al. ............. 709/206 |
| 8,797,864 B2 * | 8/2014 | Gershinsky ............ H04L 47/12 370/230 |
| 2003/0037146 A1 * | 2/2003 | O'Neill ........................ 709/226 |

(Continued)

OTHER PUBLICATIONS

International Patent Application # PCT/IB2013/061028 Search Report dated May 12, 2014.

(Continued)

*Primary Examiner* — Tan H Trinh

(57) ABSTRACT

A method includes classifying signaling messages to be transmitted from a mobile communication terminal into one or more classes, wherein each class corresponds to a respective event relating to the terminal and specifies the signaling messages that become irrelevant when the event occurs. The signaling messages are queued for transmission in a queue. In response to detecting an occurrence of a given event, the irrelevant signaling messages are removed from the queue based on the class specifying irrelevant signaling messages corresponding to the given event.

20 Claims, 2 Drawing Sheets

(56) References Cited

U.S. PATENT DOCUMENTS

| | | | |
|---|---|---|---|
| 2003/0131135 A1* | 7/2003 | Yun .......................... | G06F 9/546 709/249 |
| 2005/0060643 A1* | 3/2005 | Glass et al. ................. | 715/501.1 |
| 2006/0106941 A1* | 5/2006 | Singhal et al. ............... | 709/238 |
| 2007/0078995 A1* | 4/2007 | Benard .................... | G06F 9/542 709/230 |
| 2007/0190978 A1* | 8/2007 | White et al. ............... | 455/412.1 |
| 2009/0313252 A1* | 12/2009 | Gupta et al. ...................... | 707/8 |
| 2010/0220626 A1* | 9/2010 | Das et al. ...................... | 370/252 |
| 2011/0235575 A1* | 9/2011 | Tapia et al. .................... | 370/328 |
| 2012/0330913 A1* | 12/2012 | Devadhar ............ | G06F 11/1446 707/703 |

OTHER PUBLICATIONS

3GPP TS 25.322, "Technical Specification Group Radio Access Network; Radio Link Control (RLC) protocol specification", Release 11, version 11.0.0, 90 pages, Sep. 2012.

3GPP TS TS 36.323, "Technical Specification Group Radio Access Network; Evolved Universal Terrestrial Radio Access (E-UTRA); Packet Data Convergence Protocol (PCDP) specification", Release 11, version 11.0.0, 27 pages, Sep. 2012.

* cited by examiner

SELECTIVE LAYER-2 FLUSHING IN MOBILE COMMUNICATION TERMINALS

CROSS-REFERENCE TO RELATED APPLICATIONS

This application claims the benefit of U.S. Provisional Patent Application 61/739,418, filed Dec. 19, 2012, whose disclosure is incorporated herein by reference.

FIELD OF THE DISCLOSURE

The present disclosure relates generally to wireless communication, and particularly to methods and systems for selective discarding of messages in communication equipment.

BACKGROUND

Many communication protocols specify multiple communication layers. For example, the various cellular communication protocols specified by the Third Generation Partnership Project (3GPP) use a hierarchical structure comprising a physical layer (also referred to as PHY or Layer-1—L1), Layer-2 (L2), a Radio Resource Control (RRC) layer and a Non-Access stratum (NAS) layer.

Among other tasks, the various layers transfer control-plane or signaling messages. In Universal Mobile Telecommunications System (UMTS) networks, for example, control-plane messages are transferred as Radio Link Control Service Data Units (RLC SDUs), as specified, for example, in "Technical Specification Group Radio Access Network; Radio Link Control (RLC) protocol specification (Release 11)," TS 25.322, version 11.0.0, September, 2012, which is incorporated herein by reference.

In Evolved Universal Terrestrial Radio Access (E-UTRA) networks, also referred to as Long Term Evolution (LTE) or LTE-Advanced (LTE-A), control-plane messages are transferred as Packet Data Convergence Protocol (PDCP) SDUs, as specified, for example, in "Technical Specification Group Radio Access Network; Evolved Universal Terrestrial Radio Access (E-UTRA); Packet Data Convergence Protocol (PDCP) specification (Release 11)," TS 36.323, version 11.0.0, September, 2012, which is incorporated herein by reference.

The description above is presented as a general overview of related art in this field and should not be construed as an admission that any of the information it contains constitutes prior art against the present patent application.

SUMMARY

An embodiment that is described herein provides a method including classifying signaling messages to be transmitted from a mobile communication terminal into one or more classes. Each class corresponds to a respective event relating to the terminal and specifies the signaling messages that become irrelevant when the event occurs. The signaling messages are queued for transmission in a queue. In response to detecting an occurrence of a given event, the irrelevant signaling messages are removed from the queue based on the class specifying irrelevant signaling messages corresponding to the given event.

In some embodiments, queuing the signaling messages includes buffering the signaling messages between a control layer and a radio layer in a modem of the terminal. In an embodiment, queuing the signaling messages includes marking each queued signaling message with at least one mark corresponding to one or more classes to which the signaling message belongs. In an example embodiment, classifying the signaling messages includes defining at least one class specifying channel-setup signaling messages. In another embodiment, classifying the signaling messages includes defining at least one class corresponding to mobility events that are indicative of mobility of the mobile communication terminal.

In a disclosed embodiment, classifying the signaling messages includes defining at least one class, which specifies measurement report signaling messages and which corresponds to an error event in a radio link of the mobile communication terminal. In an embodiment, removing the signaling messages includes deleting the measurement report signaling messages relating to the radio link from the queue, in response to detecting the error event in the radio link. In another embodiment, removing the signaling messages includes deleting from the queue a first version of a periodic signaling message in response to availability of a second version of the periodic signaling message, more recent than the first version.

There is additionally provided, in accordance with an embodiment that is described herein, apparatus including a memory and processing circuitry. The memory is configured to store a queue holding signaling messages for transmission. The processing circuitry is configured to classify the signaling messages into one or more classes, wherein each class corresponds to a respective event and specifies the signaling messages that become irrelevant when the event occurs, and, in response to detecting an occurrence of a given event, to remove from the queue the irrelevant signaling messages based on the class specifying irrelevant signaling messages corresponding to the given event.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Embodiments that are described herein provide improved methods and systems for processing signaling messages in communication equipment. The disclosed techniques enable selective deletion of messages that are pending for transmission, upon occurrence of an event that renders these messages irrelevant. The embodiments described herein refer mainly to signaling messages that are pending for transmission in a mobile communication terminal, but the disclosed techniques can be applied in a similar manner in other suitable types of communication equipment.

In some embodiments, the mobile communication terminal classifies signaling messages that are pending for transmission into classes. Each class corresponds to a respective event, and comprises the signaling messages that become irrelevant when the event occurs.

For example, if the terminal encounters a radio link failure, measurement reports relating to this radio link are no longer relevant. Thus, in an embodiment, the terminal classifies the measurement reports into a particular class, which corresponds to a radio link failure event. As another example, if the terminal performs hand-off to a different base station, measurement reports relating to the previous base station become irrelevant. Thus, in an embodiment, the terminal classifies the measurement reports into a class corresponding to a hand-off event, so as to enable skipping measurements reports that precede the hand-off event.

The terminal stores the pending messages in a queue. Under normal conditions, the terminal empties the queue and transmits the messages in a First-In First-Out (FIFO) manner regardless of the classification. Upon occurrence of an event, however, the terminal removes the signaling messages that were classified in the corresponding class (i.e., the signaling messages that became irrelevant as a result of the event) from the queue.

The methods and systems described herein improve the performance of the mobile communication terminal in several respects. By discarding signaling messages that become irrelevant, the terminal uses its uplink channel resources more efficiently, providing higher bandwidth and smaller latency for uplink transmissions. Reducing the latency of signaling messages helps to reduce the probability of time-out conditions on the network side, which may lead to disconnection.

Moreover, transmission of irrelevant signaling messages sometimes causes logical inconsistencies between the terminal and the network, which may lead to errors and disconnections. Removal of irrelevant signaling messages avoids these problems. Furthermore, the disclosed techniques reduce the likelihood of overflow and possible loss of important signaling messages. The disclosed techniques also enable the use of a smaller queue in the terminal, and therefore reduce hardware size and cost. The power consumption of the terminal is further reduced since irrelevant and unnecessary signaling messages are not transmitted.

Figure 1:
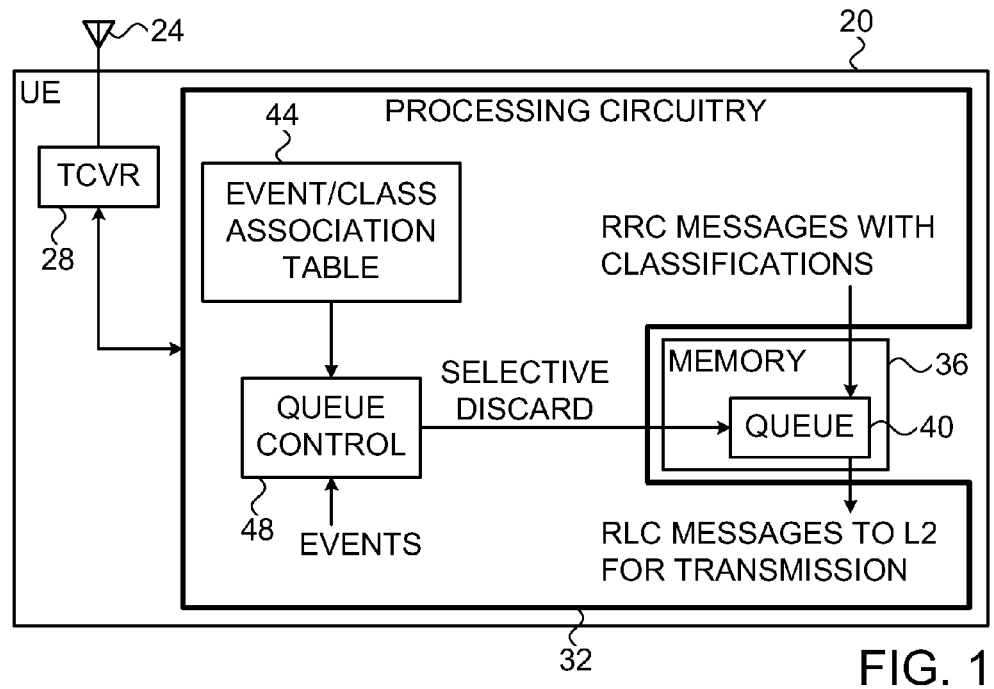
FIG. 1 is a block diagram that schematically illustrates a mobile communication terminal, in accordance with an embodiment that is described herein.

FIG. 1 is a block diagram that schematically illustrates a mobile communication terminal 20, in accordance with an embodiment that is described herein. Terminal 20 is also referred to as a User Equipment (UE). In the embodiments described herein, UE communicates in a cellular network operating in accordance with the Universal Mobile Telecommunications System (UMTS) or Evolved Universal Terrestrial Radio Access (E-UTRA, also referred to as LTE or LTE-A) specifications. Alternatively, however, UE 20 may operate in accordance with any other suitable communication protocol.

UE 20 communicates with a base station (not shown in the figure), which is also referred to as NodeB or eNodeB. In the present example, UE 20 comprises an antenna 24 for transmitting and receiving Radio Frequency (RF) signals to and from the base station, a transceiver (TCVR) 28 that downconverts received downlink signals and up-converts uplink signals for transmission, processing circuitry 32 that carries out the various processing functions of the UE, and a memory 36 used for various storage purposes.

Among other tasks, UE 20 transmits to the base station signaling messages, also referred to as control-plane messages. The communication protocol used by the UE (e.g., UMTS or LTE) specifies a hierarchy of communication layers (referred to below simply as layers for brevity), and signaling messages may originate from various layers. In the embodiments described herein, the layers comprise a Layer-1 (L1, also referred to as a physical layer or PHY), a Layer-2 (L2), a Radio Resource Control (RRC) layer and a Non-Access Stratum (NAS) layer. Alternatively, however, other suitable layer hierarchies can be used. Processing of the entire protocol stack, including the various layers, is carried out by processing circuitry 32.

Typically, NAS and RRC signaling messages are forwarded from the RRC layer to the L2 layer, for transmission to the base station and to the network in general. In UMTS, for example, signaling messages are delivered to L2 as Radio Link Control Service Data Units (RLC SDUs). In E-UTRA, signaling messages are delivered to L2 as Packet Data Convergence Protocol (PDCP) SDUs. The embodiments described herein refer mainly to queuing of such signaling messages, and therefore FIG. 1 focuses on UE elements relating to queuing of messages.

In the embodiment of FIG. 1, memory 36 comprises a queue 40 that is configured to queue signaling messages between the RRC layer and L2. Processing circuitry 32 adds signaling messages to the end of queue 40, and retrieves signaling messages from the head of queue 40 for transmission. The queuing operations in UMTS are typically performed by the Radio Link Control (RLC) layer. The examples below refer mainly to a UMTS UE, in which the RLC layer handles RRC PDUs. Alternatively, in an E-UTRA UE, this role is played by the PDCP layer.

In some embodiments, processing circuitry 32 performs selective discarding of signaling messages in queue 40. The processing circuitry classifies the NAS and RRC messages into one or more classes. Each class corresponds to a respective event, and comprises the signaling messages that become irrelevant when the event occurs. Generally, a given signaling messages may be classified into more than one class, i.e., may become irrelevant in response to more than one event. Several examples of signaling messages, and events that render them irrelevant, are described below.

In an embodiment, processing circuitry 32 comprises an event/class association table 44, which holds the associations between classes of signaling messages and events that render the messages irrelevant. The processing circuitry further comprises a queue control unit 48, which receives notifications of various events, and also has access to event/class association table 44.

Typically, when a certain event occurs, queue control unit 48 queries table 44 to find the class or classes of signaling messages that become irrelevant as a result of the event. Queue control unit 48 then removes the signaling messages belonging to these classes from queue 40. (The removal action is marked "SELECTIVE DISCARD" in the figure).

Processing circuitry 32 reads the pending signaling messages from the head of queue 40, and transmits the messages using TCVR 28 to the base station. Since irrelevant messages have been removed from the queue, uplink resources are used more efficiently, and possible logical inconsistencies in the management of the link are prevented.

The UE configuration seen in FIG. 1 is an example configuration, which is depicted solely for the sake of clarity. In alternative embodiments, any other suitable UE configuration can be used. For example, the functional partitioning among units 44 and 48 in processing circuitry 32 is given purely by way of example. In alternative embodiments, the queue management tasks of the processing circuitry may be performed using any other suitable configuration of any desired number of units.

Some UE elements that are not mandatory for understanding of the disclosed techniques have been omitted from the figures for the sake of clarity. The different UE elements are typically implemented using dedicated hardware, such as using one or more Application-Specific Integrated Circuits (ASICs), Radio frequency Integrated Circuits (RFIC) and/or Field-Programmable Gate Arrays (FPGAs). Alternatively, some UE elements may be implemented using software executing on programmable hardware, or using a combination of hardware and software elements. Memory 36 may comprise any suitable type of memory, e.g., Random Access Memory (RAM).

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory. In some embodiments, some elements of UE 20 may be fabricated in a chip-set.

In various embodiments, processing circuitry 32 classifies the signaling messages into various types of classes, which corresponds to various kinds of events. In one example embodiment, in response to a radio link failure event or similar irrecoverable error relating to the radio link, processing circuitry 32 discards pending measurement reports relating to this radio link. In this embodiment, table 44 defines that radio link measurement reports are classified in a particular class, and that this class corresponds to radio link failure events. This feature is important because, not only are these measurement reports obsolete, their presence in the queue may delay transmission of signaling messages used for recovering from the radio link failure (e.g., Cell-Update or Radio-Bearer-Reconfiguration-Complete messages).

In an example implementation, processing circuitry 32 defines two classes: Class A comprises measurement reports, and class B comprises all other RRC messages. In this embodiment, upon encountering an irrecoverable radio link error or radio link failure, processing circuitry removes all signaling messages belonging to class A from queue 40.

In another example embodiment, following a mobility event such as hand-off or reselection of UE 20 to a different base station, processing circuitry 32 discards pending signaling messages relating to the previous base station. In this embodiment, table 44 defines that signaling messages relating to a given base station are classified in a particular class, and that this class corresponds to mobility events (that are indicative of the mobility of UE 20).

In yet another embodiment, processing circuitry 32 uses the selective discarding mechanism to remove an old periodic signaling message when a more recent version of the periodic signaling message is available.

The scenarios above are given solely by way of example. In alternative embodiments, processing circuitry 32 may define any other suitable set of classes (e.g., measurement reports, channel setup messages or radio link messages) relating to any other suitable set of events (e.g., mobility events or radio link failure or error events).

In some embodiments, upon adding a signaling message to queue 40, processing circuitry 32 marks the message with a tag or other mark that is indicative of the class or classes to which the message belongs. In order to discard the signaling messages of a particular class, queue control unit 48 identifies the messages in queue 40 whose mark corresponds to the class to be discarded, and removes the identified messages from the queue.

In some embodiments, the disclosed technique is implemented using a dedicated message interface between the RRC and RLC layers, or alternatively between the NAS and RLC layers via the RRC layer. In an example embodiment, when adding a signaling message to queue 40, the RRC layer (or possibly the NAS layer via the RRC layer) indicates the class of the message to the RLC layer in a dedicated field of the RLC-xM-Data-Req message, as specified in the 3GPP TS 25.322 specification, cited above. In order to discard the signaling messages of one or more classes from the queue, the RRC layer (or possibly the NAS layer via the RRC layer) notifies the RLC layer of the classes to be discarded using a new message denoted RLC-xM-Discard-Req. In response to this request, the RLC layer discards the messages belonging to the indicated classes from queue 40.

Figure 2:
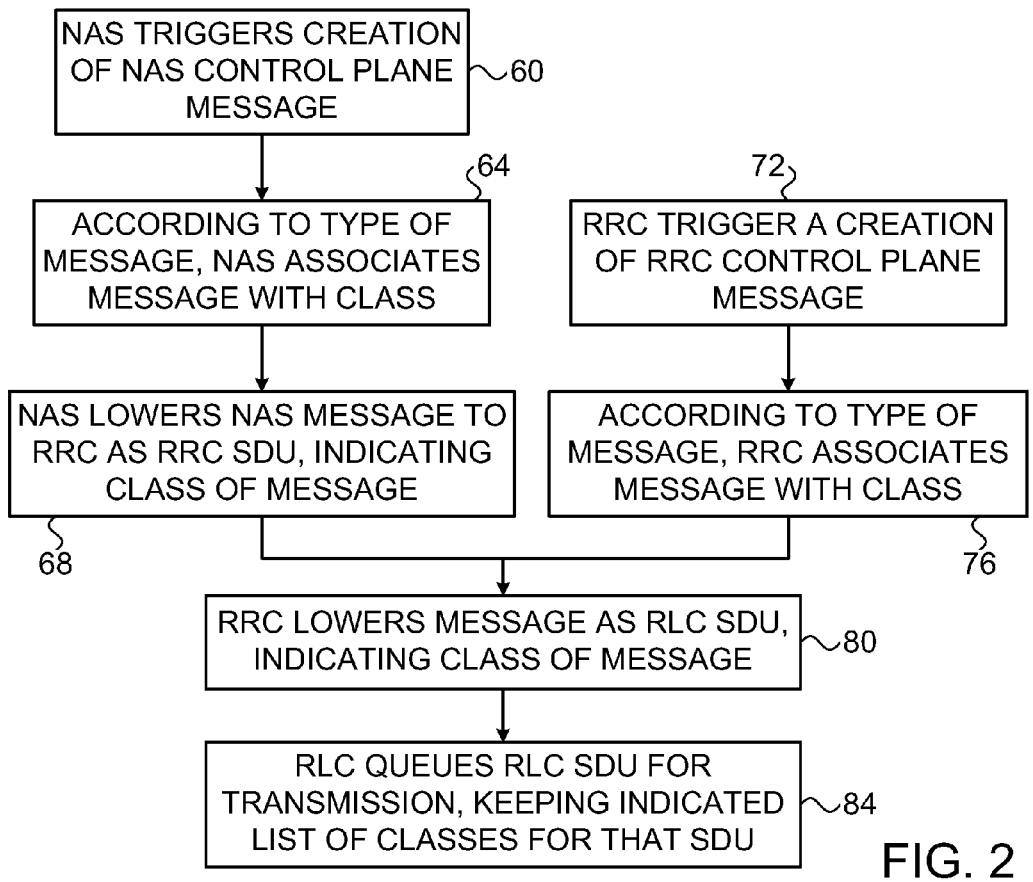
FIG. 2 is a flow chart that schematically illustrates a method for queuing signaling messages, in accordance with an embodiment that is described herein.

FIG. 2 is a flow chart that schematically illustrates a method for queuing signaling messages (also referred to as control plane messages), in accordance with an embodiment that is described herein. The method is typically carried out by processing circuitry 32 of UE 20. The left-hand-side of the figure describes queuing of a NAS-layer control plane message. The right-hand-side of the figure describes queuing of an RRC-layer control plane message.

For a NAS-layer control plane message, the method begins with the NAS layer triggering creation of the message, at a NAS creation operation 60. The NAS layer associates the message with a certain class, at a NAS classification operation 64. The NAS layer provides the message to the RRC layer as an RRC SDU, and indicates the class of the message to the RRC layer, at a NAS transfer operation 68, in an embodiment.

For an RRC-layer control plane message, the method begins with the RRC layer triggering creation of the message, at an RRC creation operation 72. The RRC layer associates the message with a certain class, at an RRC classification operation 76.

From this point the queuing method is the same for NAS-layer and RRC-layer control plane messages. The RRC layer provides the message to the RLC layer as an RLC SDU, at an RLC transfer operation 80. The RLC layer queues the RLC SDU in queue 40, at a queuing operation 84, while retaining the information regarding the class or classes to which the message belongs.

Figure 3:
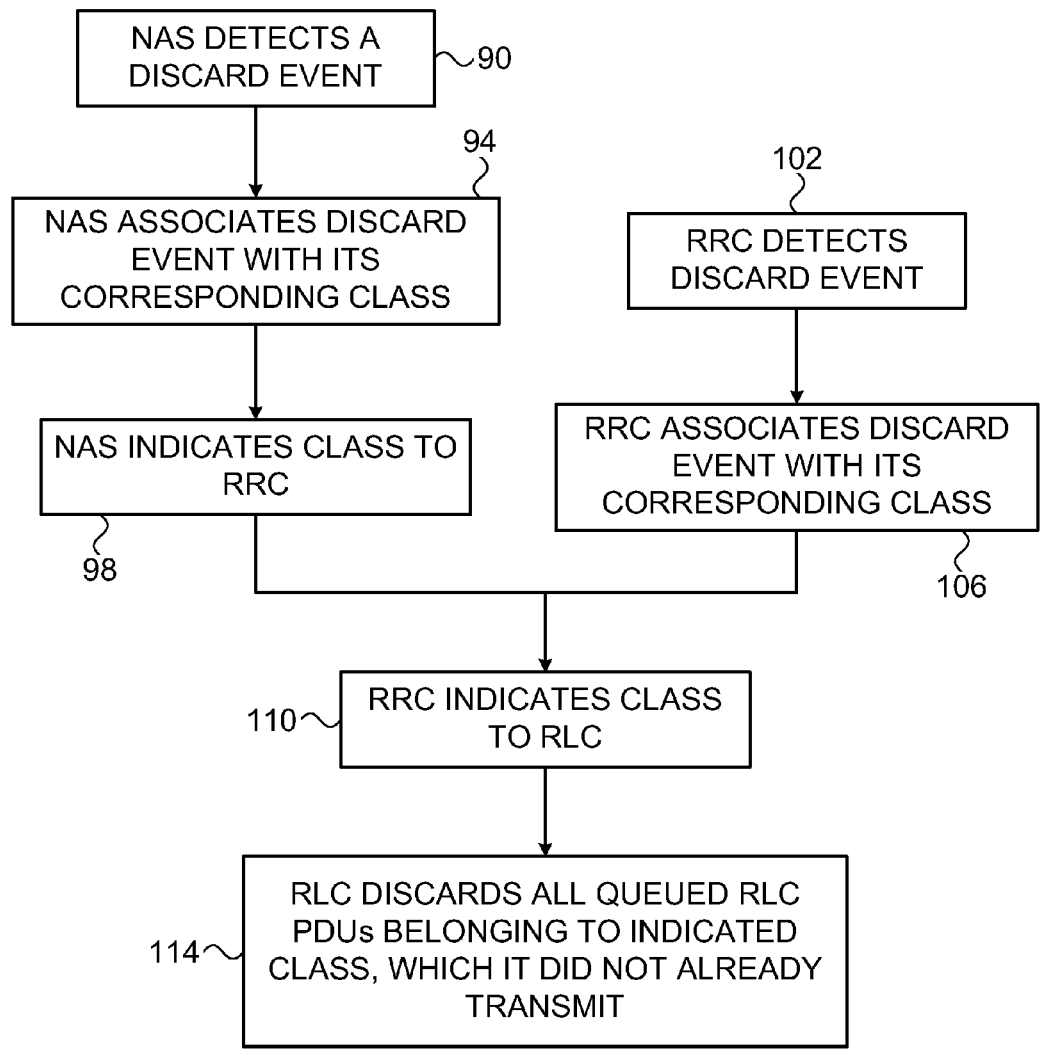
FIG. 3 is a flow chart that schematically illustrates a method for selecting flushing of queued signaling messages, in accordance with an embodiment that is described herein.

FIG. 3 is a flow chart that schematically illustrates a method for selecting flushing of queued signaling messages, in accordance with an embodiment that is described herein. The method is typically carried out by processing circuitry 32 of UE 20. The left-hand-side of the figure describes selective flushing in response to detecting a discard event by the NAS layer. The right-hand-side of the figure describes selective flushing in response to detecting a discard event by the RRC layer.

For a NAS-layer discard event, the method begins with the NAS layer detecting the event, at a NAS detection operation 90. At a NAS association operation 94, the NAS layer associates the discard event with the corresponding class (e.g., by looking up table 44). The NAS layer indicates the class to the RRC layer, at a class notification operation 98.

For an RRC-layer discard event, the method begins with the RRC layer detecting the event, at an RRC detection operation 102. At an RRC association operation 106, the RRC layer associates the discard event with the corresponding class.

From this point, the selective flushing method is the same for NAS-layer and RRC-layer discard events. The RRC indicates to the RLC layer the class to be deleted, at a class indication operation 110. The RLC layer discards from queue 40 all the pending RLC SDUs that belong to the class in question, at a discarding step 114.

The methods of FIGS. 2 and 3 are depicted solely by way of example. In alternative embodiments, any other suitable method can be used for carrying out the selective message flushing described herein.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
classifying signaling messages to be transmitted from a mobile communication terminal into one or more classes, including at least a given class that specifies the signaling messages that become irrelevant when the mobile communication terminal transitions between base stations;
queuing the signaling messages for transmission in a queue; and
when an event occurs in which the mobile communication terminal transitions from a first base station to a second base station, removing from the queue one or more of the pending signaling messages that relate to the first base station and belong to the given class.

2. The method according to claim 1, wherein queuing the signaling messages comprises buffering the signaling messages between a control layer and a radio layer in a modem of the terminal.

3. The method according to claim 1, wherein queuing the signaling messages comprises marking each queued signaling message with at least one mark corresponding to one or more classes to which the signaling message belongs.

4. The method according to claim 1, wherein classifying the signaling messages comprises defining at least one class specifying channel-setup signaling messages.

5. The method according to claim 1, wherein classifying the signaling messages comprises defining at least one class corresponding to mobility events that are indicative of mobility of the mobile communication terminal.

6. The method according to claim 1, wherein classifying the signaling messages comprises defining at least one class, which specifies measurement report signaling messages and which corresponds to an error event in a radio link of the mobile communication terminal.

7. The method according to claim 6, wherein removing the signaling messages comprises deleting the measurement report signaling messages relating to the radio link from the queue, in response to detecting the error event in the radio link.

8. The method according to claim 1, wherein removing the signaling messages comprises deleting from the queue a first version of a periodic signaling message in response to availability of a second version of the periodic signaling message, more recent than the first version.

9. Apparatus, comprising:
a memory, which is configured to store a queue holding signaling messages for transmission; and
processing circuitry, which is configured to classify the signaling messages into one or more classes, including at least a given class that specifies the signaling messages that become irrelevant when the apparatus transitions between base stations, and, when an event occurs in which the apparatus transitions from a first base station to a second base station, to remove from the queue one or more of the pending signaling messages that relate to the first base station and belong to the given class.

10. The apparatus according to claim 9, wherein the processing circuitry is configured to queue the signaling messages between a control layer and a radio layer in the processing circuitry.

11. The apparatus according to claim 9, wherein the processing circuitry is configured to mark each queued signaling message with at least one mark corresponding to one or more classes to which the signaling message belongs.

12. The apparatus according to claim 9, wherein the processing circuitry is configured to classify the signaling messages to at least one class specifying channel-setup signaling messages.

13. The apparatus according to claim 9, wherein the processing circuitry is configured to classify the signaling messages to at least one class corresponding to mobility events that are indicative of mobility of the apparatus.

14. The apparatus according to claim 9, wherein the processing circuitry is configured to classify the signaling messages to at least one class, which specifies measurement report signaling messages and which corresponds to an error event in a radio link of the apparatus.

15. The apparatus according to claim 14, wherein the processing circuitry is configured to delete the measurement report signaling messages relating to the radio link from the queue, in response to detecting the error event in the radio link.

16. The apparatus according to claim 9, wherein the processing circuitry is configured to delete from the queue a first version of a periodic signaling message in response to availability of a second version of the periodic signaling message, more recent than the first version.

17. A mobile communication terminal comprising the apparatus of claim 9.

18. A chipset for processing signals in a mobile communication terminal, comprising the apparatus of claim 9.

19. A method, comprising:
classifying signaling messages to be transmitted from a mobile communication terminal into one or more classes, including at least a given class that specifies the signaling messages that become irrelevant upon an error or a failure in a radio link on which the mobile communication terminal communicates;
queuing the signaling messages for transmission in a queue; and
when the error or the failure occurs in the radio link on which the mobile communication terminal communicates, removing from the queue one or more of the pending signaling messages that convey measurement reports for the radio link and belong to the given class.

20. Apparatus, comprising:
a memory, which is configured to store a queue holding signaling messages for transmission; and
processing circuitry, which is configured to classify the signaling messages into one or more classes, including at least a given class that specifies the signaling messages that become irrelevant upon an error or a failure in a radio link on which the apparatus communicates, and, when the error or the failure occurs in the radio link on which the apparatus communicates, to remove from the queue one or more of the pending signaling messages that convey measurement reports for the radio link and belong to the given class.

* * * * *